United States Patent
Cao et al.

(10) Patent No.: US 9,533,708 B2
(45) Date of Patent: Jan. 3, 2017

(54) BEARING DEVICE HAVING AT LEAST ONE KINGPIN

(71) Applicants: Allen Cao, Schweinfurt (DE); Josef Hahn, Niederwerrn (DE)

(72) Inventors: Allen Cao, Schweinfurt (DE); Josef Hahn, Niederwerrn (DE)

(73) Assignee: AKTIEBOLAGET SKF, Gothenburg (SE)

(*) Notice: Subject to any disclaimer, the term of this patent is extended or adjusted under 35 U.S.C. 154(b) by 42 days.

(21) Appl. No.: 14/407,629

(22) PCT Filed: Jun. 14, 2013

(86) PCT No.: PCT/EP2013/062333
§ 371 (c)(1),
(2) Date: Jun. 22, 2015

(87) PCT Pub. No.: WO2013/189846
PCT Pub. Date: Dec. 27, 2013

(65) Prior Publication Data
US 2015/0298732 A1    Oct. 22, 2015

(30) Foreign Application Priority Data
Jun. 18, 2012   (DE) .................. 10 2012 210 248

(51) Int. Cl.
*B62D 7/18*       (2006.01)
*F16C 11/04*      (2006.01)
(Continued)

(52) U.S. Cl.
CPC .............. *B62D 7/18* (2013.01); *F16C 11/045* (2013.01); *F16C 21/00* (2013.01); *F16C 17/10* (2013.01);
(Continued)

(58) Field of Classification Search
CPC .......... B62D 7/18; F16C 11/045; F16C 21/00
See application file for complete search history.

(56) References Cited

U.S. PATENT DOCUMENTS 1,865,202 A     6/1932  Milligan
3,288,485 A *  11/1966  White ..................... B62D 7/18
                                                              280/93.512
(Continued)

FOREIGN PATENT DOCUMENTS

CN      2385133 Y      6/2000
CN      101135340 A    3/2008
CS      8609411        2/1988

OTHER PUBLICATIONS

International Search Report from PCT/EP2013/062333.

*Primary Examiner* — Thomas R. Hannon
(74) *Attorney, Agent, or Firm* — Bryan Peckjian; SKF USA Inc. Patent Dept.

(57) ABSTRACT

A bearing device includes at least one kingpin, a carrier unit, a first bearing unit, and a second bearing unit. The first and second bearing units rotatably support the carrier unit relative to the kingpin. The first bearing unit includes an angular contact sliding bearing that includes a first bearing element, a second bearing element and a third bearing element, the first and second bearing elements being movable relative to each other during at least one operating process, and the third bearing element being disposed between the first bearing element and the second bearing element. During the operating process the third bearing element slides on the first and/or second bearing element, and the third bearing element is formed at least partially from a polymer.

22 Claims, 1 Drawing Sheet

(51) Int. Cl.
*F16C 21/00* (2006.01)
*F16C 17/10* (2006.01)
*F16C 17/18* (2006.01)
*F16C 19/36* (2006.01)
*F16C 33/20* (2006.01)

(52) U.S. Cl.
CPC .............. *F16C 17/18* (2013.01); *F16C 19/364* (2013.01); *F16C 33/20* (2013.01)

(56) References Cited

U.S. PATENT DOCUMENTS

| | | | | |
|---|---|---|---|---|
| 4,915,530 | A | * | 4/1990 | Tomlinson ............... B62D 7/18 280/93.512 |
| 5,340,137 | A | | 8/1994 | Carraro et al. |
| 6,029,986 | A | * | 2/2000 | Bodin ...................... B62D 7/18 280/93.512 |
| 6,217,046 | B1 | * | 4/2001 | Bodin ...................... B62D 7/18 280/93.512 |
| 7,163,217 | B2 | * | 1/2007 | Bodin ...................... B62D 7/18 280/89.1 |
| 2003/0011160 | A1 | | 1/2003 | Bodin |
| 2007/0223850 | A1 | | 9/2007 | Lopes et al. |

\* cited by examiner

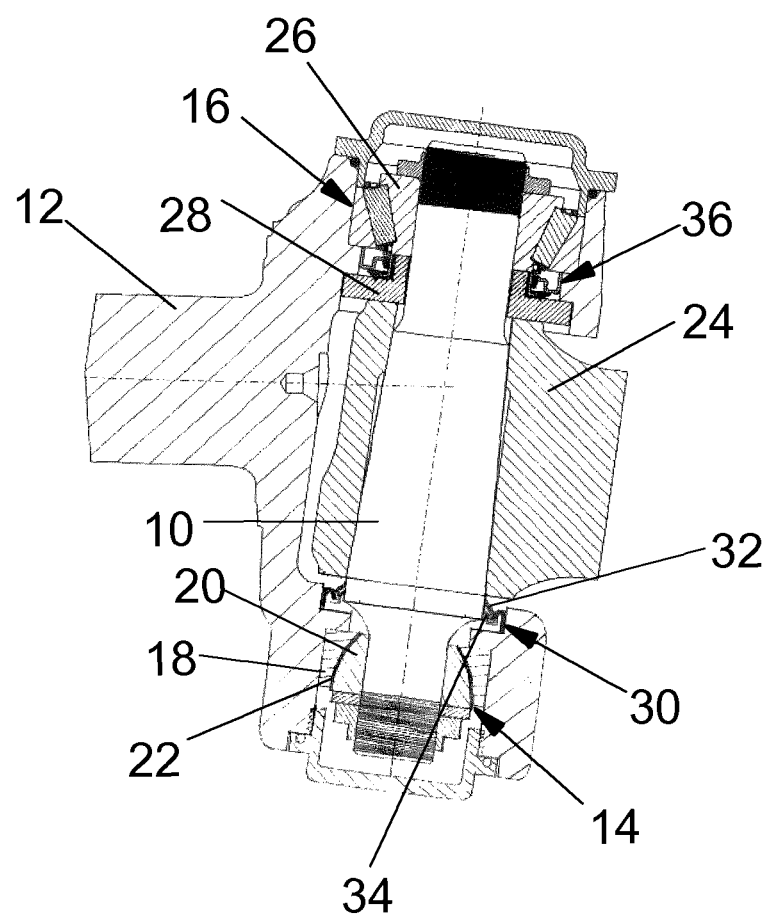

BEARING DEVICE HAVING AT LEAST ONE KINGPIN

CROSS-REFERENCE

This application is the U.S. National Stage of International Application No. PCT/EP2013/062333 filed on Jun. 14, 2013, which claims priority to German patent application no. 10 2012 210 248.5 filed on Jun. 18, 2012.

BACKGROUND

A bearing device is known including at least one kingpin.

SUMMARY

An aspect of the disclosure is to provide a bearing device having at least one kingpin that is simple and efficient to manufacture and use.

A bearing unit is proposed including at least one kingpin, a carrier unit, a first bearing unit, and a second bearing unit, wherein the first and the second bearing unit support the carrier unit rotatably with respect to the pin. Using an inventive design, a high efficiency and in particular a maintenance-free operation can be achieved. The first bearing unit is formed as an angular contact sliding bearing.

BRIEF DESCRIPTION OF THE DRAWINGS

Further advantages will become apparent from the following drawing description. An exemplary embodiment of the invention is depicted in the drawing. The drawing, the description, and the claims contain numerous features in combination. The person skilled in the art will also advantageously consider the features individually and combine them into further meaningful combinations.

FIG. 1 shows a partial section through an inventive bearing device.

DETAILED DESCRIPTION

FIG. 1 shows a partial section through an inventive bearing device. The bearing device includes a kingpin 10, a carrier unit 12, a first bearing unit 14, and a second bearing unit 16, wherein the first and the second bearing unit 14, 16 support the carrier unit 12 rotatably with respect to the kingpin 10. In a fully assembled state a wheel is mounted on the carrier unit. An axle 24 of the bearing device is attached to the kingpin 10. The first bearing unit 14 is disposed on an underside of the kingpin 10. Furthermore, the bearing unit 14 is formed as an angular contact sliding bearing. The first bearing unit 14 includes a first and a second bearing element 18, 20 which rotate relative to each other during at least one operating process, and wherein a third bearing element 22 of the first bearing unit 14 is disposed between the first and the second bearing element 18, 20. The first bearing element 18 includes a bearing surface which is a part of an inner surface of a hollow sphere having a spherical cavity. The second bearing element 20 includes a bearing surface which is a part of a sphere-outer-surface. The third bearing element is disposed between the first and the second bearing element 18, 20, which third bearing element abuts on the bearing elements 18, 20 in an operating state.

The third bearing element comprised of a polymer makes possible a lubrication-free operation. The first bearing unit is thus maintenance-free. The bearing elements 18, 20 are formed from metal.

The third bearing element 22 is formed from a polyoxymethylene composite material or from PTFE composite fibers. In one operating process the third bearing element slides on at least one of the other bearing elements. Due to a suitable selection of the bearing element, a suitable friction is defined during the sliding, so that an operator who causes the sliding by steering has good mechanical feedback.

The second bearing unit 16 is formed as a tapered roller bearing. The bearing device includes an axle 24 which is attached to the kingpin 10, and a unit 28 of the bearing device is disposed between an inner ring 26 of the second bearing unit 16 and the axle 24, which unit 28 in an operating state transmits forces from the inner ring 26 to the axle 24. The unit 28 is substantially annular and includes an L-shaped cross-section. It abuts on the inner ring 26 and the axle 24. A cassette seal 36 of the bearing device abuts on the second bearing unit 16 and the unit 28. The unit 28 formed in one-piece protects the second bearing unit 16 from contamination. In an operating state the second bearing unit 16 is disposed on an upper side of the pin. With reverse load, i.e. when a tire held by the carrier unit hangs and does not rest on the ground, the underside of the unit 28 abuts on the axle 24.

The bearing device makes possible pivoting movements for steering of one of the tires carried by the carrier unit. The bearing device is maintenance-free and requires no relubrication.

Furthermore, the bearing device includes a seal unit 30 including a radial shaft seal ring which comprises two seal lips 32, 34. The seal unit 30 comprises a lubricant formed from grease, which lubricant is disposed between the two seal lips 32, 34. The lubricant ensures a good sealing effect of the seal unit 30.

During an installation of the bearing device, the two bearing units 14, 16 are preloaded against each other along a longitudinal direction of the pin, and namely screwed onto the two ends of the pin using nuts. The bearing device is thus play-free in the unloaded state.

The bearing device is part of an Ackerman steering system. The Ackerman steering system is part of a not-powered vehicle. The vehicle is steerable. Furthermore a wheel which is carried by the carrier unit is not powered.

In an operating state wherein a tire carried by the carrier unit rests on the ground, the tapered roller bearing supports forces which act in its radial direction and are caused by the standing of the tire. Furthermore a force exerted by the ground on the tire is transmitted onward by the tapered roller bearing into the axle. A force exerted by the carrier unit 12 on the pin in the longitudinal direction of the pin is transmitted by the tapered roller bearing to the pin.

REFERENCE NUMBER LIST

10 Kingpin
12 Carrier unit
14 Bearing unit
16 Bearing unit
18 Bearing element
20 Bearing element
22 Bearing element
24 Axle
26 Inner ring
28 Unit
30 Seal unit
32 Seal lip
34 Seal lip
36 Cassette seal

The invention claimed is:
1. A bearing device
comprising: at least one kingpin;
a carrier unit;
a first bearing unit; and
a second bearing unit,
wherein the first bearing unit and the second bearing unit rotatably support the carrier unit relative to the kingpin,
wherein the first bearing unit comprises an angular contact sliding bearing,
wherein the first bearing unit includes a first bearing element, a second bearing element having a first circumference at a top-most portion smaller than a second circumference at a bottom-most portion, and a third bearing element, the first bearing element and the second bearing element being movable relative to each other during at least one operating process, and the third bearing element being disposed between the first bearing element and the second bearing element,
wherein during the operating process the third bearing element slides on the first bearing element or slides on the second bearing element or slides on both the first bearing element and on the second bearing element, and
wherein the third bearing element is formed at least partially from a polymer.
2. The bearing device according to claim 1,
wherein the second bearing unit comprises a tapered roller bearing having an inner ring and an outer ring, and
wherein the bearing device includes an axle attached to the kingpin and a structural element disposed between the inner ring of the second bearing unit and the axle, which structural element in an operating state transmits forces from the inner ring to the axle.
3. The bearing device according to claim 2, including a seal unit including two seal lips, the seal unit including a lubricant between the two seal lips.
4. The bearing device according to claim 2, wherein the first bearing unit is preloaded against the second bearing unit.
5. An Ackerman steering system including a bearing device according to claim 2.
6. A vehicle including an Ackerman steering system according to claim 5.
7. The bearing device according to claim 1, wherein the first bearing element has a first bearing surface configured as a part of an inner surface of a hollow hemisphere and the second bearing element has a second bearing surface configured as a part of an outer surface of a sphere.
8. The bearing device according to claim 7, wherein the second bearing unit comprises a tapered roller bearing having an inner ring and an outer ring, and
wherein the bearing device includes an axle attached to the kingpin and a structural element disposed between the inner ring of the second bearing unit and the axle, which structural element in an operating state transmits forces from the inner ring to the axle.
9. A bearing device comprising: at least one kingpin;
a carrier unit;
a first bearing unit; and
a second bearing unit,
wherein the first bearing unit and the second bearing unit rotatably support the carrier unit relative to the kingpin,
wherein the first bearing unit comprises an angular contact sliding bearing including at least one bearing element having a first circumference at a top-most portion smaller than a second circumference at a bottom-most portion and the second bearing unit comprises a tapered roller bearing having an inner ring and an outer ring, and
wherein the bearing device includes an axle attached to the kingpin and a structural element disposed between the inner ring of the second bearing unit and the axle, which structural element in an operating state transmits forces from the inner ring to the axle.
10. The bearing device according to claim 9, wherein the first bearing unit includes a first bearing element, a second bearing element and a third bearing element, the first bearing element and the second bearing element being movable relative to each other during at least one operating process, and the third bearing element being disposed between the first bearing element and the second bearing element,
wherein during the operating process the third bearing element slides on the first bearing element or slides on the second bearing element or slides on both the first bearing element and on the second bearing element, and
wherein the third bearing element is formed at least partially from a polymer.
11. The bearing device according to claim 9, wherein the first bearing unit includes a first bearing element having a first bearing surface configured as a part of an inner surface of a hollow hemisphere and a second bearing element having a second bearing surface configured as a part of an outer surface of a sphere.
12. The bearing device according to claim 11, wherein the first bearing unit includes a third bearing element, the first bearing element and the second bearing element being movable relative to each other during at least one operating process, and the third bearing element being disposed between the first bearing element and the second bearing element,
wherein during the operating process the third bearing element slides on the first bearing element or slides on the second bearing element or slides on both the first bearing element and on the second bearing element, and
wherein the third bearing element is formed at least partially from a polymer.
13. The bearing device according to claim 9, including a seal unit including two seal lips, the seal unit including a lubricant between the two seal lips.
14. The bearing device according to claim 9, wherein the first bearing unit is preloaded against the second bearing unit.
15. An Ackerman steering system including a bearing device according to claim 9.
16. A bearing device
comprising: at least one kingpin;
a carrier unit;
a first bearing unit; and
a second bearing unit,
wherein the first bearing unit and the second bearing unit rotatably support the carrier unit relative to the kingpin,
wherein the first bearing unit having a first circumference at a top-most portion smaller than a second circumference at a bottom-most portion, the comprises an angular contact sliding bearing including a first bearing element having a first bearing surface configured as a part of an inner surface of a hollow hemisphere and a second bearing element having a first circumference at a top-most portion smaller than a second circumference at a bottom-most portion and having a second bearing surface configured as a part of an outer surface of a sphere.

17. The bearing device according to claim 16, wherein the first bearing unit includes a third bearing element, the first bearing element and the second bearing element being movable relative to each other during at least one operating process, and the third bearing element being disposed between the first bearing element and the second bearing element, wherein during the operating process the third bearing element slides on the first bearing element or slides on the second bearing element or slides on both the first bearing element and on the second bearing element, and wherein the third bearing element is formed at least partially from a polymer.

18. The bearing device according to claim 16, wherein the second bearing unit comprises a tapered roller bearing having an inner ring and an outer ring, and wherein the bearing device includes an axle attached to the kingpin and a structural element disposed between the inner ring of the second bearing unit and the axle, which structural element in an operating state transmits forces from the inner ring to the axle.

19. The bearing device according to claim 18, wherein the first bearing unit includes a third bearing element, the first bearing element and the second bearing element being movable relative to each other during at least one operating process, and the third bearing element being disposed between the first bearing element and the second bearing element, wherein during the operating process the third bearing element slides on the first bearing element or slides on the second bearing element or slides on both the first bearing element and on the second bearing element, and wherein the third bearing element is formed at least partially from a polymer.

20. The bearing device according to claim 16, including a seal unit including two seal lips, the seal unit including a lubricant between the two seal lips.

21. The bearing device according to claim 16, wherein the first bearing unit is preloaded against the second bearing unit.

22. An Ackerman steering system including a bearing device according to claim 16.

* * * * *